US008484062B2

(12) United States Patent
Fitterer et al.

(10) Patent No.: US 8,484,062 B2
(45) Date of Patent: *Jul. 9, 2013

(54) ASSESSMENT OF SKILLS OF A USER

(75) Inventors: Annemarie R. Fitterer, Austin, TX (US); Kristin M. Hazlewood, Austin, TX (US); Shevaun-Ann M. Fontenot, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,358

(22) Filed: Jul. 6, 2012

(65) Prior Publication Data
US 2012/0271682 A1 Oct. 25, 2012

Related U.S. Application Data

(63) Continuation of application No. 12/650,741, filed on Dec. 31, 2009, now Pat. No. 8,265,976.

(51) Int. Cl.
*G06Q 10/00* (2006.01)
(52) U.S. Cl.
USPC ....... 705/7.15; 705/7.13; 705/7.14; 705/7.39; 705/7.42
(58) Field of Classification Search
USPC ................................................ 705/7.11–7.42
See application file for complete search history.

(56) References Cited

U.S. PATENT DOCUMENTS

| | | | |
|---|---|---|---|
| 6,824,462 | B2 | 11/2004 | Lydon et al. |
| 7,475,286 | B2 | 1/2009 | Altaf et al. |
| 7,552,199 | B2 | 6/2009 | Pomerantz |
| 2002/0169687 | A1 * | 11/2002 | Perkowski ...................... 705/26 |
| 2003/0082508 | A1 | 5/2003 | Barney |
| 2004/0063085 | A1 | 4/2004 | Ivanir et al. |
| 2005/0027487 | A1 * | 2/2005 | Iyer ............................... 702/185 |
| 2005/0096921 | A1 * | 5/2005 | Felder et al. ...................... 705/1 |
| 2005/0125422 | A1 * | 6/2005 | Hirst .............................. 707/100 |
| 2005/0222899 | A1 * | 10/2005 | Varadarajan et al. ........... 705/11 |
| 2006/0053372 | A1 | 3/2006 | Adkins et al. |
| 2006/0210052 | A1 | 9/2006 | Yamanaka et al. |
| 2006/0224434 | A1 * | 10/2006 | Rumi et al. ...................... 705/10 |
| 2007/0074149 | A1 | 3/2007 | Ognev et al. |

(Continued)

OTHER PUBLICATIONS

South African Management Development Institute (SAMDI), Training Manual Module 2: Training needs assessment(2007), http://www.amdin.org/documents/d00104/SAMDI_TOT_Mudule_2 (55 pages).

*Primary Examiner* — Lynda Jasmin
*Assistant Examiner* — Sujay Koneru
(74) *Attorney, Agent, or Firm* — Charles L. Moore; Moore & Van PLLC

(57) ABSTRACT

A method, operable on a processing device, for assessment of skills of a user may include receiving, by the processing device, an error message reporting an error associated with the user. The method may also include determining, by the processing device, a categorization of the error. Determining the categorization of the error may include assigning one of a plurality of predetermined skill ratings to the user. Each predetermined skill rating may be associated with a predefined condition. The method may additionally include generating, by the processing device, a report for assessment of the skills of the user. The report may include an identification of the user, the error, identification of a system if a system associated error, identification of a product if a product associated error, the categorization of the error and the predetermined skill rating assigned to the user.

20 Claims, 5 Drawing Sheets

U.S. PATENT DOCUMENTS

2007/0172803 A1   7/2007   Hannaford et al.
2007/0192157 A1*  8/2007   Gooch ............................. 705/9
2007/0233536 A1* 10/2007   Johnson et al. .................. 705/7
2008/0228671 A1*  9/2008   Nagaraj ........................ 705/500
2008/0313602 A1* 12/2008   Tillmann et al. .............. 717/106
2010/0146483 A1*  6/2010   Komarov et al. ............. 717/120

* cited by examiner

ASSESSMENT OF SKILLS OF A USER

The present application is a continuation of prior U.S. patent application Ser. No. 12/650,741, filed Dec. 31, 2009 and is incorporated herein in its entirety by reference.

BACKGROUND

Aspects of the present invention relate to evaluating or assessing abilities, and more particularly to a method, system and computer program product for assessment of skills of a user.

In current economic times, companies are looking for ways to cut costs and one way to do that is to reduce labor costs. However when turn over occurs and cheaper labor is brought in, often there is a significant gap in the skills required to perform job functions and can end up costing the company in terms of delayed project completion and insufficient skills for maintaining environments. Employees that lack the necessary skills are typically relying heavily on internal or outside technical support such as product support for a particular product or system the employees need to use to complete their projects. Often times management is unaware of the skill gap. An automatic way to provide an accurate assessment of the employees' skills, as the skills relate to the employees' specific job function and the products the employees are required to know and use, to management for the purposes of performance evaluation, skills assessment, education planning and also to generate a list of requirements to use for future training and hiring is needed.

BRIEF SUMMARY

According to one aspect of the present invention, a method, operable on a processing device, for assessment of skills of a user may include receiving, by the processing device, an error message reporting an error associated with the user. The method may also include determining, by the processing device, a categorization of the error. Determining the categorization of the error may include assigning one of a plurality of predetermined skill ratings to the user. Each predetermined skill rating may be associated with a predefined condition. The method may additionally include generating, by the processing device, a report for assessment of the skills of the user. The report may include an identification of the user, the error, identification of a system if a system associated error, identification of a product if a product associated error, the categorization of the error and the predetermined skill rating assigned to the user.

According to another aspect of the present invention, a processing device for assessment of skills of a user may include a processor. The processor may be configured to receive an error message reporting an error associated with the user. The processor may also include a module operable on the processor for assessment of skills of the user. The module may include a module for determining a categorization of the error, wherein determining the categorization of the error may include assigning one of a plurality of predetermined skill ratings to the user, each predetermined skill rating being associated with a predefined condition. The processor may also include a module for generating a report for assessment of skills of the user. The report may include an identification of the user, the error, identification of a system if a system associated error, identification of a product if a product associated error, the categorization of the error and the predetermined skill rating assigned to the user.

According to a further aspect of the present invention, a computer program product for assessment of skills of a user may include a computer readable storage medium having computer readable program code embodied therewith. The computer readable program code may include computer readable program code configured to receive an error message reporting an error associated with the user. The computer readable program code may also include computer readable program code configured to determine a categorization of the error. The categorization of the error may be determined by assigning one of a plurality of predetermined skill ratings to the user. Each predetermined skill rating may be associated with a predefined condition. The computer readable program code may further include computer readable program code configured to generate a report for assessment of skills of the user. The report may include an identification of the user, the error, identification of a system if a system associated error, identification of a product if a product associated error, the categorization of the error and the predetermined skill rating assigned to the user.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
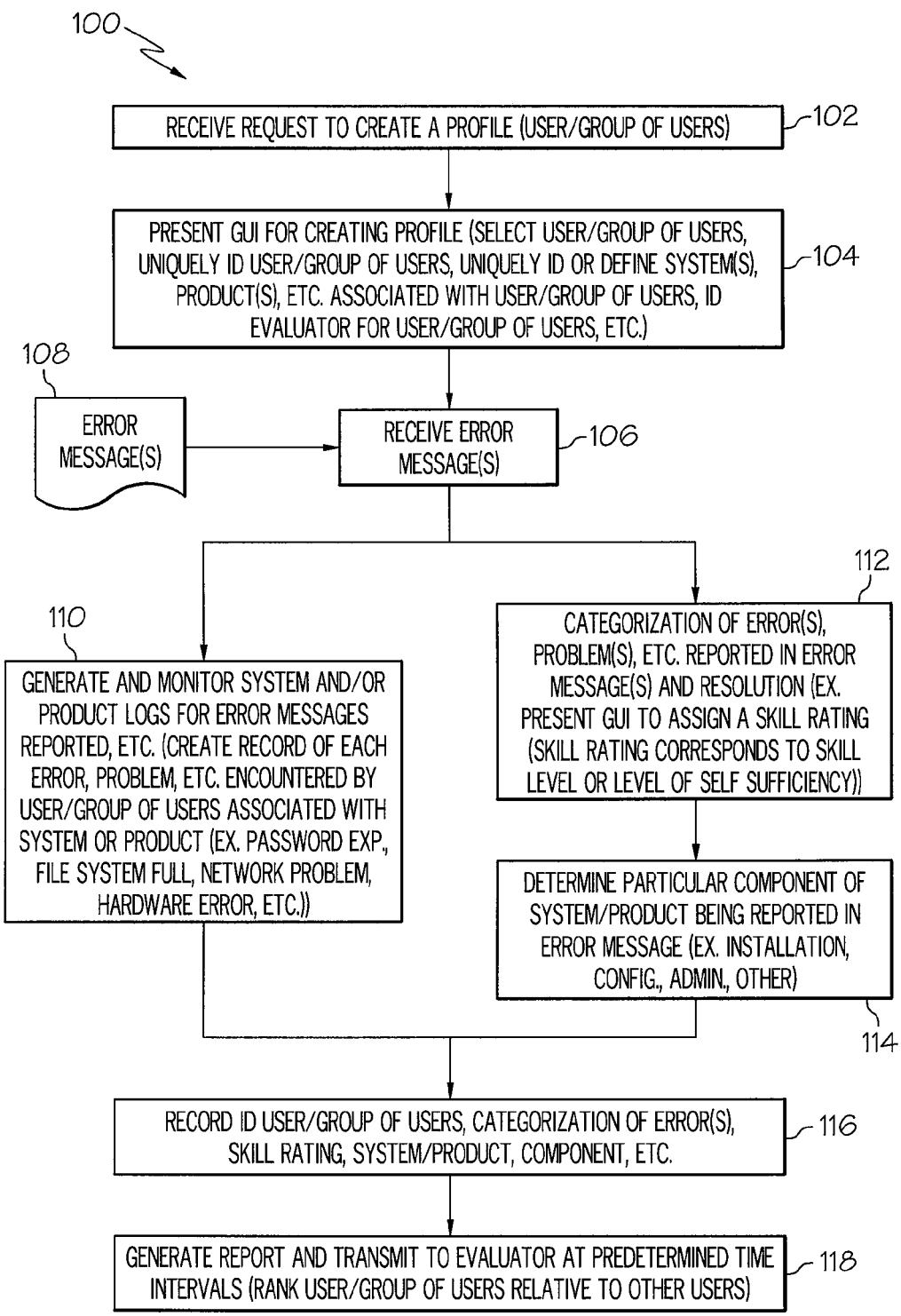
FIG. 1 is a flowchart of an example of a method for assessment of skills of a user in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of an example of a method 100 for assessment of skills of a user in accordance with an embodiment of the present invention. As used herein, user may be a single user or a group of users. In block 102, a request to create a profile for the user may be received. An exemplary method for creating a profile will be described in more detail with reference to FIG. 2.

In block 104, a graphical user interface (GUI) or other mechanism may be presented for creating the profile. The GUI may include or provide a mechanism for defining a unique identification of the user or group of users. For example, the GUI may provide a field or fields for entering a name and/or identification number for the user or employee or group of users or employees. The GUI may also provide a mechanism for defining a unique identification of the environment or system and/or a mechanism for defining a unique identification of the product. For example, the GUI may include fields for entering an identification for an environment, or a system identification and a product identification or menus for selecting an environment or a system identification and a product identification. As used herein, environment may mean a computer system or systems or data processing system or systems depending upon the job or role of the user or group of users. For example, an individual could be responsible for a single system and all applications running on the single system or the individual could be responsible for one or more applications running on a set of systems but the individual may not be responsible for the overall system administration.

A field or mechanism may also be provided by the GUI to define a relationship of the user relative the system and/or the product. The GUI may also provide a mechanism or field for identifying a evaluator and any criteria for performing an evaluation of the user. A reporting schedule for generating and sending a report to the evaluator may also be defined in the GUI.

In block 106, an error message 108 or messages may be received by a system or processing device for assessment of the skills of a user. An example of a system or processing device for assessment of the skills of a user will be described with reference to FIG. 4.

In block 110, a system error log or logs and/or a product error log or logs for recording errors reported in the error messages 108 may be generated. A record of each error encountered by the user associated with a system, network or product being used by the user may be recorded in the system error log and product error log depending upon the cause of the error. As used herein, a network error may also be defined as or considered as a system error. In another embodiment, depending upon the architecture, network being used, or other factors, network errors may be recorded and monitored in a separate network error log. Also as used herein, error is a generic term and may include but is not necessarily limited to any problem, issue, anomaly or other occurrence that may be encountered in using a particular product, system or network. A product may be a computer program product or software product, computer application or similar product or a component of any of these.

In block 110, the system error log or logs and the product error log or logs may be monitored for various occurrences and based on predefined criteria or rules. For example, monitoring the system error log or logs may include tracking each time a reported system error reoccurs, tracking each time a reported system error is unresolved for more than a selected time period, or tracking other parameters related to reported system errors. Similarly, monitoring the product error log or logs may include tracking each time a reported product error occurs, tracking each time a reported product error is unresolved for more than a selected time period, or tracking other parameters related to reported product errors. Examples of errors may include password expiration, file system full, network problems, hardware faults or errors, or similar errors.

In block 112, a categorization of the error reported in the error message 108 or messages may be determined. Determining the categorization of the error may include but is not necessarily limited to assigning one of a plurality of predetermined skill ratings to the user. Each predetermined skill rating may be associated with a predefined condition as described in more detail herein. The skill rating may correspond to a skill level or level of self-sufficiency of the user. As an example, a GUI may be presented to assign one of the plurality of skill ratings based on a predefined set of criteria related to the nature of the error, reoccurrences of the error by the same user, behavior of the user, prior training or lack of training of the user, adequacy of documentation, etc. An example of a method for determining or defining a categorization of an error will be described in more detail with reference to FIGS. 3A and 3B. A resolution of the error may also be determined or defined in block 112.

In block 114, a particular component of the system and or product being reported in the error message 108 may be determined. For example, a determination may be made if the error occurred during installation of the product or system, configuration of the product or system, administration of the product or system, or during some other evolution, phase, or operation of a component part of the system or product.

In block 116, an identification for a user or group of users may be recorded along with other information or parameters associated with the user that may be reported or used for assessment of skills of the user. Other information or parameters that may be recorded may include but is not necessarily limited to a categorization of the error or errors, a skill rating assigned to the user, a system identification, a product identification, and a component identification. Information from monitoring the system and product error logs in block 110 may also be recorded.

In block 118, a report may be automatically generated based on the information recorded in block 116. Accordingly, the report may be generated using the system error log and the product error log along with the identification of the user, the identification of the environment or system, the identification of the product and the categorization of the error to generate the report. The report may provide an assessment of the user's skill rating in working with a computing environment including the environment, system and the product and the user's ability to complete an assigned task using the system and/or the product or environment. Information may be categorized in the report based on particular aspects or portions of the system and product from which errors occur and a frequency of each specific error to determine whether additional user skill or skills may be needed and with accuracy what additional user skill or skills may be needed to more precisely define training. Based on the component or area which requires user skill improvement, a list of free and fee based education or training may be automatically provided in the report. Additionally, the report may rank order the user or group of users relative to other users or groups of users.

The report may be automatically transmitted to an evaluator assigned to the user at predetermined time intervals. The predetermined time intervals for automatically generating and transmitting each report may be defined in the user profile as described herein.

Figure 2:
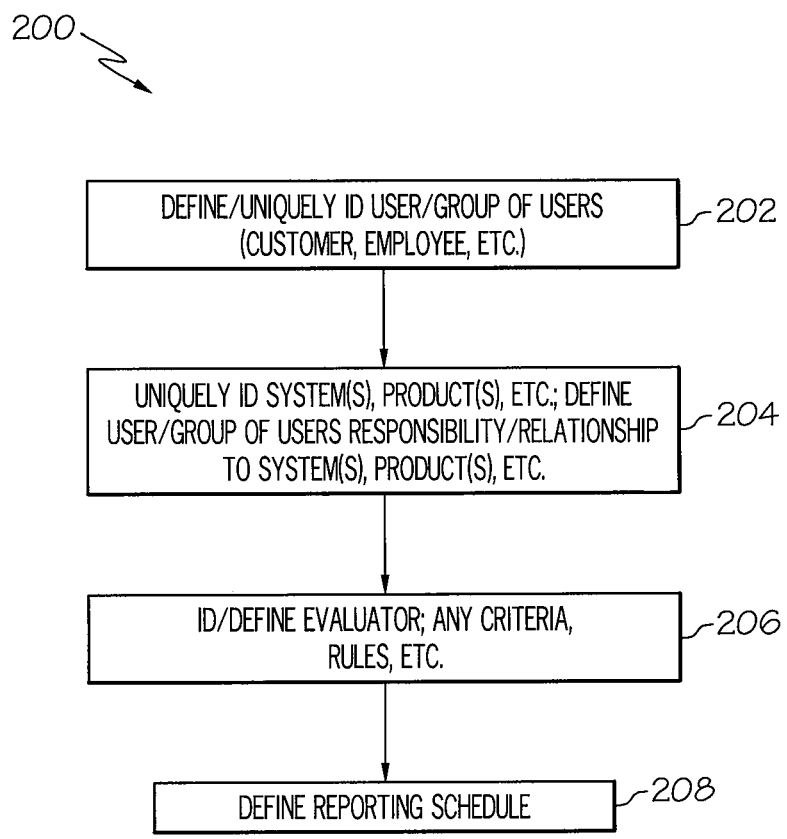
FIG. 2 is a flowchart of an example of a method for creating a profile for a user in accordance with an embodiment of the present invention.

FIG. 2 is a flowchart of an example of a method 200 for creating a profile for the user in accordance with an embodiment of the present invention. Similar to that previously described, a GUI or other mechanism may be presented for creating the profile for the user. The GUI may include fields or drop-down lists or menus for selecting different parameters similar to those described herein for creating the profile of the user.

In block 202, a unique identification for the user or group of users may be defined. The user or group of users may be a customer that purchased the product or system or technical support from an entity using the skills assessment method and system described herein. The user or group of users may also be an employee or group of employees that an employer desires to evaluate using the skills assessment method and system described herein.

In block 204, the system or systems, product or products used by the user or group of users defined in block 202 may be uniquely identified. A responsibility or relationship of the user or group of users to the system or product may also be defined.

In block 206, an evaluator may be identified or defined. Any criteria or rules to be used by the evaluator in assessing the skills of the user or group of users may also be defined.

In block 208, a reporting schedule may be defined. Defining the reporting schedule may include selecting or entering the predetermined time interval at which the report is generated and transmitted to the evaluator in block 118 of FIG. 1.

Figure 3A:
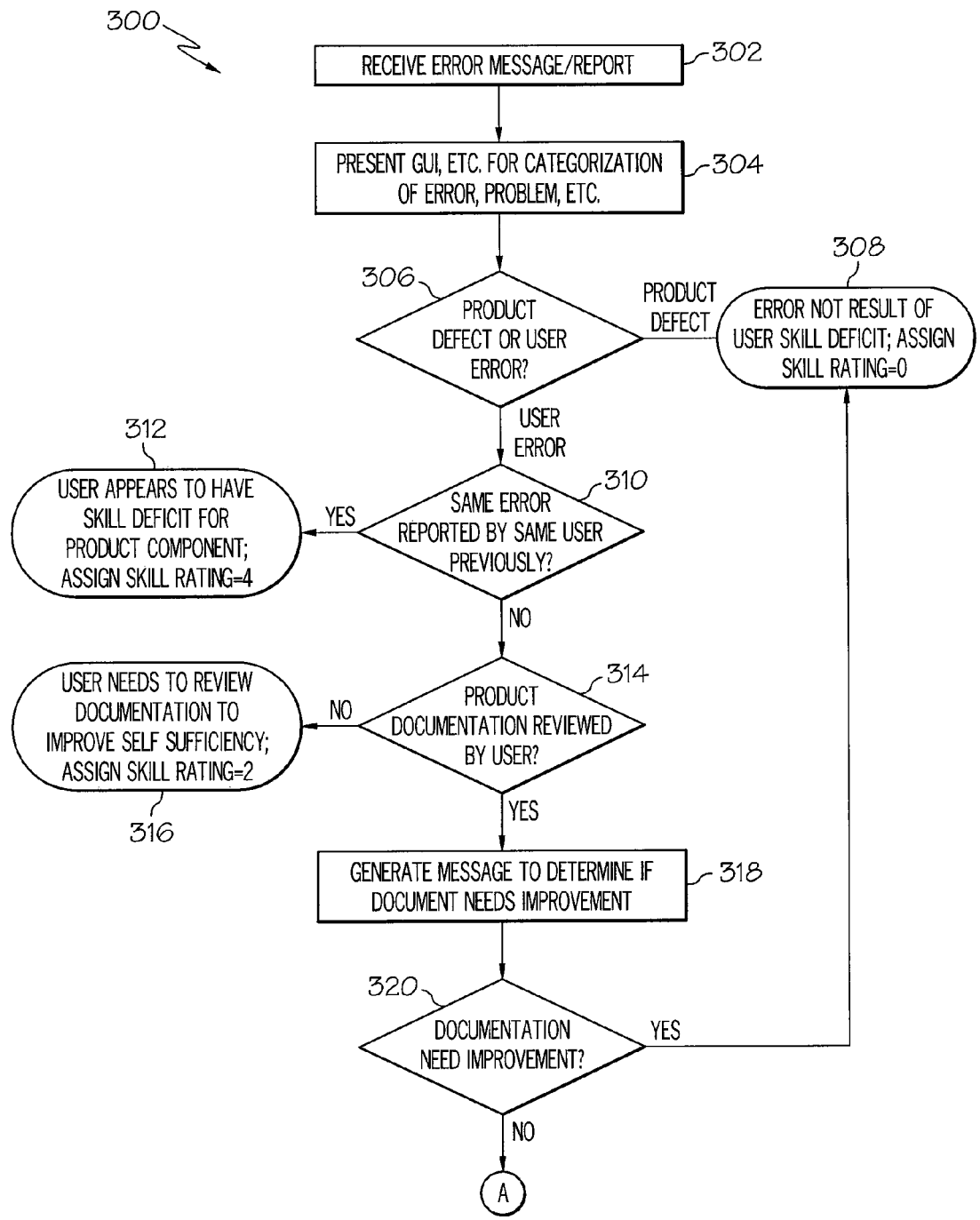
FIGS. 3A and 3B are a flowchart of an example of a method for determining a categorization of an error in accordance with an embodiment of the present invention.
Figure 3B:
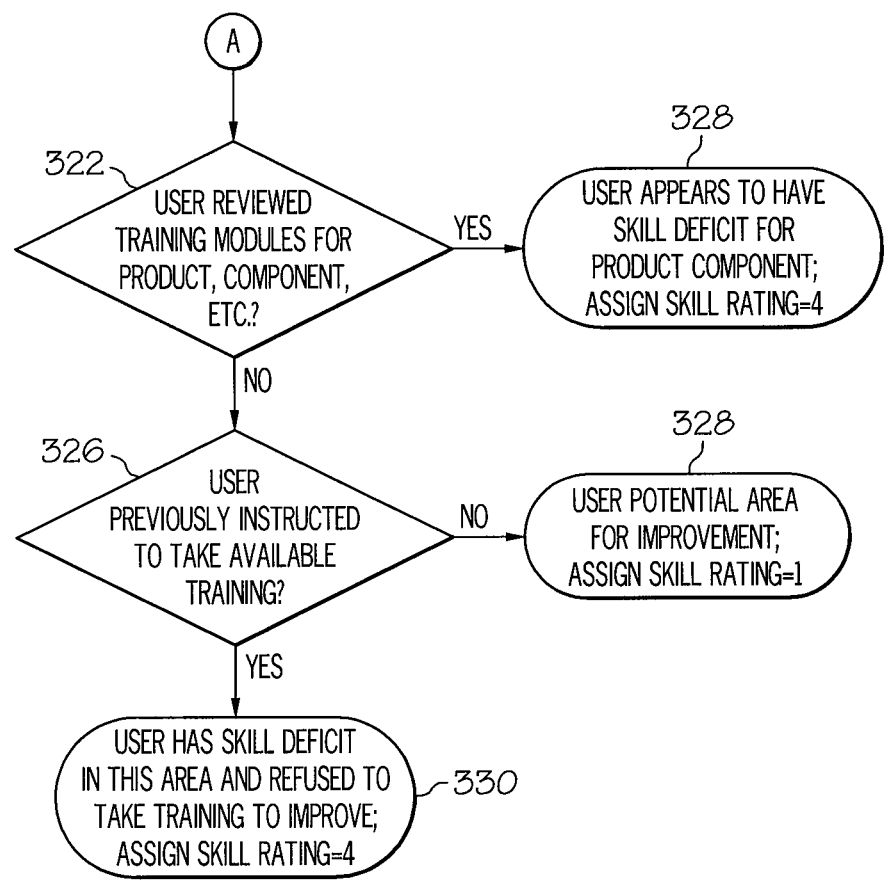

FIGS. 3A and 3B are a flowchart of an example of a method 300 for determining a categorization of an error in accordance with an embodiment of the present invention. In block 302, an error message reporting an error may be received by the system for performing the skills assessment.

In block 304, a GUI may be presented or another mechanism may be provided for categorization of the error. As previously described, error as used herein is a generic term which may include but is not necessarily limited to a problem, issue, or other occurrence or anomaly encountered by a user. The error may be defined as one of a product defect, a system error, and a user error or a similar designation may be used to define a nature of the different types of errors.

In block 306, a determination may be made whether the error is a product defect or a user error. If the error is a product defect, the method 300 may advance to a termination block 308. In termination block 308, the error may be designated or categorized as not being the result of a user skill deficit. A first predetermined skill rating may be assigned to the user in response to the error not being defined as a user error. For example, a skill rating equal to 0 may be assigned to the user in response to the error not being defined as a user error or in the example of FIG. 3A the error being a product defect.

If the error is determined to be a user error in block 306, the method 300 may advance to block 310. In block 310, a determination may be made if the user previously reported the same type of error. If the user previously reported the same type of error, the method 300 may advance to termination block 312. In termination block 312, the error may be categorized by a designation that the user appears to have a skill deficit for the product component may be recorded similar to that described with reference to block 116 in FIG. 1. The error may be further categorized by a second predetermined skill rating being assigned to the user in response to the user having previously reported the same type of error and the error being defined as a user error from block 310. In the example illustrated in FIG. 3A, a skill rating equal to 4 may be assigned to the user in response to the user having previously reported the same error and the error being determined to be a user error in block 310.

If the same error is not reported in block 310, the method 300 may advance to block 314. In block 314, a determination may be made whether the product documentation has been reviewed by the user. For example, a message may be sent to the user requesting the user to respond whether he has reviewed the product documentation. If the user has not reviewed the product documentation, the method 300 may advance to termination block 316. In termination block 316, the error may be categorized by a designation that the user needs to review the product documentation to improve self sufficiency may be recorded. A third predetermined skill rating may be assigned to the user in response to determining that the user has not reviewed the documentation for the product to further categorize the error.

If a determination is made in block 314 that the user has reviewed the product documentation, the method 300 may advance to block 318. In block 318, a message to determine if the documentation for the product needs improvement may be generated. A system administrator or evaluator may receive the message regarding whether the documentation for the product needs improvement. An evaluation of the documentation may be performed and a response entered into the system.

In block 320, a determination may be made whether the documentation needs improvement. If a determination is made in block 320 at the documentation needs improvement, the method 300 may advance to block 308 and the error may be categorized or a designation may be recorded that the error is not the result of a user skill deficit and the first predetermined skill rating (skill rating equal to 0 for example) may be assigned to the user similar to that previously described.

If a determination is made in block 320 that the documentation does not need improvement, the method 300 may advance to block 322. In block 322, a determination may be made whether the user has reviewed training modules for the product, component of the product, or the like. If a determination is made that the user has reviewed the training modules, the method 300 may advance to termination block 324. In termination block 324 the error may be categorized by a designation being recorded that the user appears to have a skill deficit for the particular product or product component. The error may also be categorized by a fourth predetermined skill rating may be assigned to the user in response to determining that the user has performed the training module or modules for the product, component, etc. In the example illustrated in FIG. 3B, the user may be assigned a skill rating equal to 4 in response to determining in block 322 that the user has reviewed training module or modules for the product or component.

If a determination is made in block 322 that the user has not reviewed the training modules, the method 300 may advance to block 326. In block 326, a determination may be made whether the user has previously been instructed to take available training. If the user has not previously been instructed to take available training, the method 300 may advance to termination block 328. In termination block 328, the error may be categorized by a designation may that the user has a potential area for improvement being recorded. A fifth predetermined skill rating may be assigned to the user in response to a training module having been available and the user not having been instructed to take the available training to also categorize the error. In the example illustrated in block 328 of FIG. 3B, the user may be assigned a skill rating of 1 in response to a training module being available and the user not having been instructed to take the training module.

If the user has been previously instructed to take the available training in block 326, the method 300 may advance to termination block 330. In termination block 330, the error may be categorized by a designation that the user has a skill deficit in a particular area and has refused to correct take the training to improve being recorded. The user may be assigned the fourth predetermined skill rating similar to termination block 312 or a sixth predetermined skill rating may be assigned to the user in response to the user having been instructed to take the available training and the user not having taken the training has instructed. In the example illustrated in block 330 of FIG. 3B, the user may be assigned a skill rating of 4 in response to the user having been instructed to perform or take the training module and the user not having performed or taken the training module.

Figure 4:
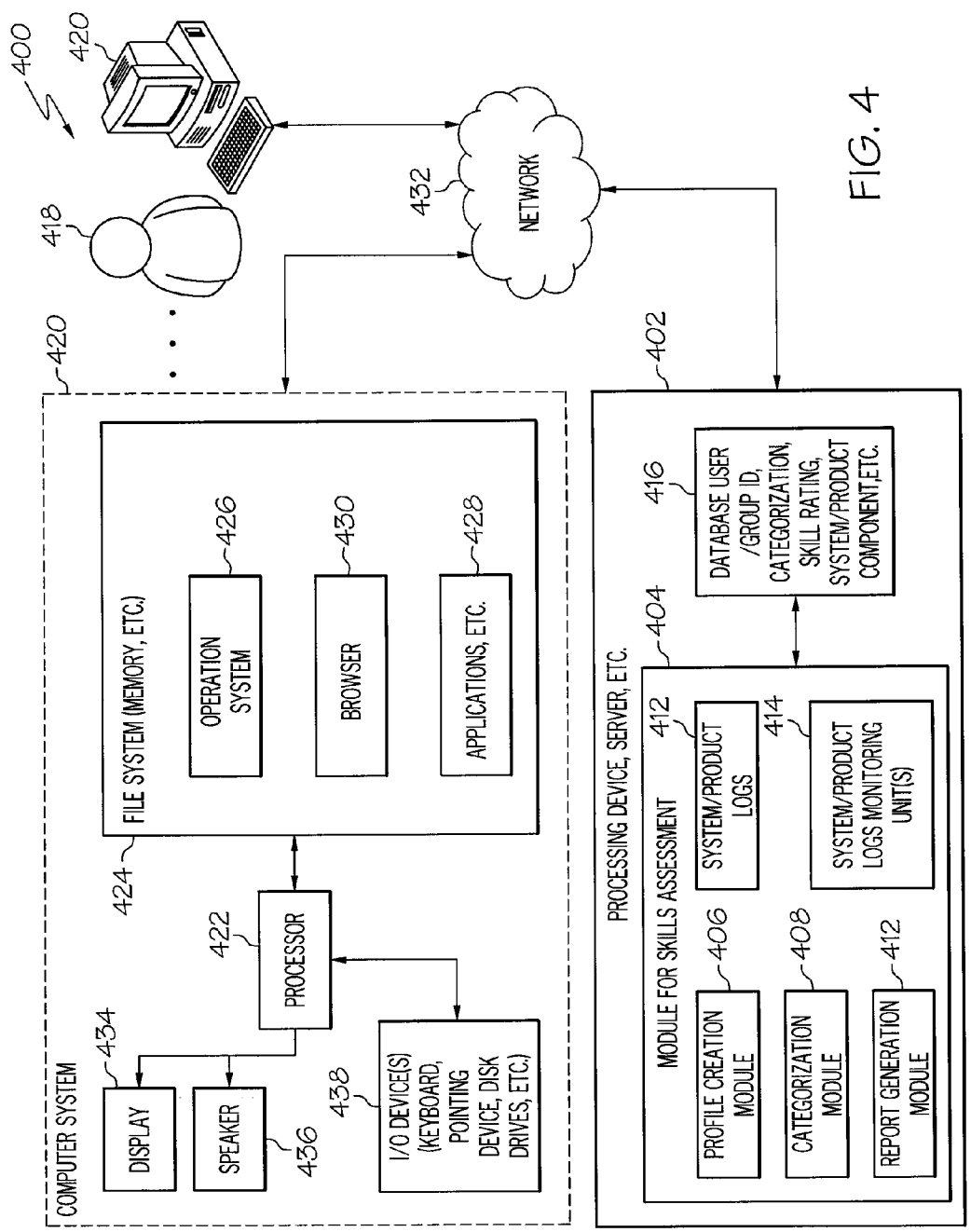
FIG. 4 is a block schematic diagram of an example of a system for assessment of skills of a user in accordance with an embodiment of the present invention.

FIG. 4 is a block schematic diagram of an example of a system 400 for assessment of skills of a user in accordance with an embodiment of the present invention. The methods 100, 200, and 300 of FIGS. 1, 2, 3A and 3B, respectively, may be embodied in or performed by the system 400. The system 400 may include a processing device 402. The processing device 402 may be a server or similar processing device. A module 404 for skills assessment may be stored on the processing device 402 and may be operable on the processing device 402 for assessment of skills of a user similar to that described herein. The module 404 may be stored on a file system of the processing device 402. Portions of or all of the methods 100, 200 and 300 may be embodied in or performed by the module 404.

The module 404 for skills assessment may include a profile creation module 406. The profile creation module 406 may perform operations similar to those described in method 200 in FIG. 2.

The module 404 for skills assessment may also include a categorization module 408. The categorization module 408 may perform operations similar to those described in method 300 of FIGS. 3A and 3B.

A report generation module 410 may also be included in the module 404 for skills assessment to generate reports similar to those described herein for assessment of the skills of a user.

A system error log or logs and product error log or logs 412 may also be stored on the processing device 402 or server. The system error log or logs and product error log or logs 412 may also be part of the module 404 for skills assessment similar to that illustrated in FIG. 4 or separate components associated with the processing device 402.

The module 404 for skills assessment may further include a monitoring unit 414 or units for monitoring the system and product logs similar to that previously described.

A database 416 may also reside on the processing device 402 or server. The database 416 may store the unique identifications for users or groups of users, categorization of errors, skill ratings, identifications of systems and products, components of systems and products, and any other information that may be used for assessment of the skills of a user similar to that described herein.

A user 418 of the assessment system, an evaluator, a system administrator or similar individual may use a computer system 420 to access the processing device 402 or server and module 404 for skills assessment. The computer system 420 may include a processor 422 to control operation of the computer system 420 and a file system 424 or memory. An operating system 426, applications 428 and other programs may be stored on the file system 424 for running or operating on the processor 422. A web or Internet browser 430 may also be stored on the file system 424 for accessing the processing device 402 or server via a network 432 for creating user profiles and receiving reports for skills assessment similar that described herein, controlling operation of the skills assessment module 404, or for other purposes related to skills assessment. The network 432 may be the Internet, an intranet or other private or proprietary network.

The computer system 420 may also include a display 434, a speaker system 436, and one or more input devices, output devices or combination input/output devices, collectively I/O devices 438. The I/O devices 438 may include a keyboard, pointing device, such as a mouse, disk drives and any other devices to permit a user, such as user 418, to interface with and control operation of the computer system 420 and to access the module 404 or system for skills assessment. The display 434 may present reports generated by the skills assessment module 404. The I/O device 438 may also present any reports and provide an interface for controlling the skills assessment module 404.

In accordance with an embodiment, based upon the interaction of the uniquely identified user profile (which could be a user ID, a set of IP addresses, etc. and have a defined evaluator) with the environment, product and system logs would create a log to keep track of errors encountered with the environment and make special notice of repeated errors. In addition the orthogonal data (pmr classification i.e. user error, product code bug etc.) associated with any ticket opened with vendor support may be used in combination with the generated error logs from the system and product logs to generate a report which may provide an accurate assessment of a user's skill level in working with an environment and their ability to complete assigned projects. A report may be automatically sent periodically to the assigned evaluator of the individual user or group being evaluated. Additionally this information could be categorized based on the areas of where the errors are occurring and frequency of errors to determine where additional skill or training may be needed. As described herein, the methods and systems may be expanded to define unique profiles for groups instead of just at an individual or single user level. By combining accurate evidence from the interaction with the environment and issues or errors reported to vendors, the skills assessment may provide valuable data which is often missed by management. The skills assessment information may be used in performing employee evaluations, to identify areas of inefficiency, to determine a set of skills to look for in future employees, and to identify areas where further education and training is needed.

The methods and systems described herein provide an automatic way to provide an accurate assessment of an employee's skills, as the skills relate to the employee's specific job function and the products the employee is required to know and use, to management for the purposes of performance evaluation, skills assessment, education planning and also to generate a list of requirements to use for future training and hiring.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method, operable on a processing device, for assessment of skills of a user, comprising:
    receiving, by the processing device, an error message reporting an error associated with the user;
    determining, by the processing device, a categorization of the error, wherein determining the categorization of the error comprises assigning one of a plurality of predetermined skill ratings to the user based on the error, each predetermined skill rating being associated with a predefined condition, wherein assigning one of the plurality of predetermined skill ratings comprises:
        assigning a first predetermined skill rating to the user in response to the error not being defined as user error;
        assigning a second predetermined skill rating to the user in response to the user having previously reported a same error and the error being defined as user error;

determining if the user has reviewed documentation for the product;
assigning a third predetermined skill rating to the user in response to determining that the user has not reviewed the documentation for the product;
generating a message to determine if the documentation for the product needs improvement in response to determining that the user has reviewed the documentation for the product; and
generating, by the processing device, a report for assessment of skills of the user, the report comprising an identification of the user, the error, identification of a system if the error is a system error, identification of a product if the error is a product error, the categorization of the error, and the predetermined skill rating assigned to the user.

2. The method of claim 1, wherein the user is a group of users.

3. The method of claim 1, further comprising:
generating and monitoring a system error log for recording each system error encountered by the user, wherein monitoring the system log comprises:
tracking each time a reported system error reoccurs; and
tracking each time the reported system error is unresolved for more than a selected time period.

4. The method of claim 3, further comprising:
generating and monitoring a product error log for recording each error encountered by the user and associated with a particular product, wherein monitoring the product log comprises:
tracking each time a reported product error reoccurs; and
tracking each time the reported product error is unresolved for more than a selected time period.

5. The method of claim 4, wherein generating the report comprises using the system error log and the product error log along with the identification of the user, the identification of the system, the identification of the product and the categorization of the error to generate the report which provides an assessment of the user's skill rating in working with a computing environment comprising the system and the product and the user's ability to complete an assigned task.

6. The method of claim 5, further comprising categorizing information in the report based on particular aspects of the system and product from which errors occur and a frequency of each specific error to determine whether additional user skill is needed and what additional user skill is needed.

7. The method of claim 6, further comprising automatically sending the report to an evaluator assigned to the user at predetermined time intervals.

8. The method of claim 1, further comprising creating a profile for the user, wherein creating the profile comprises:
providing a mechanism for defining a unique identification of the user;
providing a mechanism for defining a unique identification of the system;
providing a mechanism for defining a unique identification of the product;
providing a mechanism for defining a relationship of the user relative the system and the product;
providing a mechanism for identifying a evaluator and any criteria for performing an evaluation of the user; and
providing a mechanism for defining a reporting schedule for generating and sending the report to the evaluator.

9. The method of claim 8, wherein providing the mechanism comprises presenting a graphical user interface.

10. The method of claim 1, wherein determining a categorization comprises:
defining the error as one of a product defect, a system error, and user error; and
determining if the user previously reported the same type of error and the error being defined as user error.

11. The method of claim 10, wherein determining a categorization comprises:
determining if the user has performed any available training module for the product;
assigning a fourth predetermined skill rating to the user in response to determining that the user has performed the training module for the product;
determining if the user was previously instructed to perform the training module if available;
assigning a fifth predetermined skill rating to the user in response to the training module being available and the user not having been instructed to perform the training module; and
assigning the fourth predetermined skill rating to the user in response to the user having been instructed to perform the training module and the user not having performed the training module.

12. The method of claim 11, wherein the first predetermined skill rating corresponds to the user not having a skill deficit, the second predetermined skill rating corresponds to the user having the skill deficit, the third predetermined skill rating corresponds to the user having the skill deficit and needing to review product documents to improve self sufficiency, the fourth predetermined skill rating corresponds to the user having the skill deficit even though the user has performed an available training module; and the fifth predetermined skill rating corresponds to the user having the skill deficit and the user needing to be instructed to perform the training module.

13. A processing device for assessment of skills of a user comprising:
a processor, the processor configured to receive an error message reporting an error associated with the user;
a module operable on the processor for assessment of skills of the user, the module comprising:
a module for determining a categorization of the error, wherein determining the categorization of the error comprises assigning one of a plurality of predetermined skill ratings to the user based on the error message, each predetermined skill rating being associated with a predefined condition, the module for determining a categorization of the error comprising a unit configured for:
assigning a first predetermined skill rating to the user in response to the error not being defined as user error;
assigning a second predetermined skill rating to the user in response to the user having previously reported a same error and the error being defined as user error;
determining if the user has reviewed documentation for the product;
assigning a third predetermined skill rating to the user in response to determining that the user has not reviewed the documentation for the product;
generating a message to determine if the documentation for the product needs improvement in response to determining that the user has reviewed the documentation for the product; and
a module for generating a report for assessment of skills of the user, the report comprising an identification of the user, the error, identification of a system if the error is a system error, identification of a product if the error is a product error, the categorization of the error, and the predetermined skill rating assigned to the user.

14. The processing device of claim 13, further comprising:
a system error log for recording each system error encountered by the user;
a unit for monitoring the system log, the unit for monitoring the system log comprising:
    a module for tracking each time a reported system error reoccurs; and
    a module for tracking each time the reported system error is unresolved for more than a selected time period.

15. The processing device of claim 14, further comprising:
a product error log for recording each product error encountered by the user and associated with a particular product;
a unit for monitoring the product error log, the unit for monitoring the product error log comprising:
    a module for tracking each time a reported product error reoccurs; and
    a module for tracking each time the reported product error is unresolved for more than a selected time period.

16. The processing device of claim 13, wherein the module for determining a categorization comprises a unit configured for:
defining the error as one of a product defect, a system error, and user error; and
determining if the user previously reported the same type of error and the error being defined as user error.

17. The processing device of claim 16, wherein the module for determining a categorization further comprises a unit configured for:
determining if the user has performed any available training module for the product;
assigning a fourth predetermined skill rating to the user in response to determining that the user has performed the training module for the product;
determining if the user was previously instructed to perform the training module if available;
assigning a fifth predetermined skill rating to the user in response to the training module being available and the user not having been instructed to perform the training module; and
assigning the fourth predetermined skill rating to the user in response to the user having been instructed to perform the training module and the user not having performed the training module.

18. A computer program product for assessment of skills of a user, the computer program product comprising:
a non-transitory computer readable storage medium having computer readable program code embodied therewith, the computer readable program code comprising:
computer readable program code configured to receive an error message reporting an error associated with the user;
computer readable program code configured to determine a categorization of the error, the categorization of the error being determined by assigning one of a plurality of predetermined skill ratings to the user, each predetermined skill rating being associated with a predefined condition, the computer readable program code configured to determine a categorization of the error further comprising:
    computer readable program code configured to assign a first predetermined skill rating to the user in response to the error not being defined as the user error;
    computer readable program code configured to assign a second predetermined skill rating to the user in response to the user having previously reported the same type of error and the error being defined as user error;
    computer readable program code configured to determine if the user has reviewed documentation for the product;
    computer readable program code configured to assign a third predetermined skill rating to the user in response to determining that the user has not reviewed the documentation for the product;
    computer readable program code configured to generate a message to determine if the documentation for the product needs improvement in response to determining that the user has reviewed the documentation for the product; and
computer readable program code configured to generate a report for assessment of skills of the user, the report comprising an identification of the user, the error, identification of a system if the error is a system error, identification of a product if the error is a product error, the categorization of the error and the predetermined skill rating assigned to the user.

19. The computer program product of claim 18, wherein the computer readable program code configured to determine a categorization of the error comprises:
computer readable program code configured to define the error as one of a product defect, a system error, and user error; and
computer readable program code configured to determine if the user previously reported the same type of error and the error being defined as user error.

20. The computer program product of claim 19, wherein the computer readable program code configured to determine a categorization of the error further comprises:
computer readable program code configured to determine if the user has performed any available training module for the product;
computer readable program code configured to assign a fourth predetermined skill rating to the user in response to determining that the user has performed the training module for the product;
computer readable program code configured to determine if the user was previously instructed to perform the training module if available;
computer readable program code configured to assign a fifth predetermined skill rating to the user in response to the training module being available and the user not having been instructed to perform the training module; and
computer readable program code configured to assign the fourth predetermined skill rating to the user in response to the user having been instructed to perform the training module and the user not having performed the training module.

* * * * *